(12) United States Patent
Fu et al.

(10) Patent No.: US 11,190,092 B1
(45) Date of Patent: *Nov. 30, 2021

(54) TWO-STATOR AND FOUR-ROTOR COMBINED ENERGY-SAVING MOTOR

(71) Applicant: Shenzhen Yiji Manufacturing Co., Ltd., Shenzhen P.R. (CN)

(72) Inventors: Zhenqiang Fu, Shenzhen (CN); Zhaohong Zheng, Shenzhen (CN)

(73) Assignee: Shenzhen Yiji Manufacturing Co., Ltd., Shenzhen P.R. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,945

(22) Filed: Oct. 16, 2020

(30) Foreign Application Priority Data

May 29, 2020 (CN) .......................... 202010480054.8

(51) Int. Cl.
*H02K 16/00* (2006.01)
(52) U.S. Cl.
CPC .................................. *H02K 16/00* (2013.01)
(58) Field of Classification Search
CPC ........ H02K 1/141; H02K 1/143; H02K 1/148; H02K 1/14; H02K 16/00; H02K 16/02; H02K 16/04; H02K 2201/06
USPC .......................................... 310/112, 113, 114
See application file for complete search history.

(56) References Cited

U.S. PATENT DOCUMENTS

| 2002/0163270 | A1* | 11/2002 | Almada | H02K 1/278 310/156.47 |
| 2006/0131985 | A1* | 6/2006 | Qu | H02K 1/14 310/266 |
| 2008/0036215 | A1* | 2/2008 | Gizaw | H02K 29/03 290/55 |
| 2009/0278415 | A1* | 11/2009 | Park | H02K 16/00 310/156.08 |
| 2010/0171451 | A1* | 7/2010 | Quere | H02K 16/00 318/400.09 |
| 2010/0264769 | A1* | 10/2010 | Park | H02K 16/00 310/125 |
| 2012/0286616 | A1* | 11/2012 | Li | H02K 21/029 310/191 |
| 2016/0322873 | A1* | 11/2016 | Udo | H02K 1/278 |
| 2016/0376741 | A1* | 12/2016 | Kim | H02K 1/148 310/90 |

FOREIGN PATENT DOCUMENTS

GB          2459061 A  * 10/2009  ............. H02K 1/148

* cited by examiner

*Primary Examiner* — Quyen P Leung
*Assistant Examiner* — Eric Johnson
(74) *Attorney, Agent, or Firm* — Getech Law LLC; Jun Ye (57) ABSTRACT

The present invention discloses a new two-stator and four-rotor combined energy-saving motor, which relates to the technical field of motor. It comprises a motor shell, four rotors and two stators, wherein the stator comprises a fixing ring and stator cores, the stator cores circularly connected to the fixing ring; the rotor comprises an outer rotor part, an inner rotor part and a flange; the outer rotor part, arranged outside the cylindrical inner rotor part; a stator zone, formed between the outer rotor part and the inner rotor part; the flange, connecting the outer rotor part and the inner rotor part; the flange, dividing the stator zone into a first stator zone and a second stator zone; the two stators, arranged in the first stator zone and the second stator zone respectively.

4 Claims, 9 Drawing Sheets

TWO-STATOR AND FOUR-ROTOR COMBINED ENERGY-SAVING MOTOR

TECHNICAL FIELD

The present invention relates to the technical field of motor, and in particularly, is a new two-stator and four rotor combined energy-saving motor.

BACKGROUND ART

The traditional permanent magnet motor can be divided into internal rotor motor and external rotor motor according to the position of the rotor, wherein the internal rotor motor sets the rotor in the circular area surrounded by the stators, while the external rotor motor sets the rotor outside the stators. In a traditional permanent magnet motor, the windings on the stator are energized and automatically commutated under the action of magnetic induction hall or magnetic induction coil, which generates a rotating magnetic field of magnetic induction line and drives the rotor to rotate.

When the stator of a traditional permanent magnet motor is energized, only one side of the magnetic field generated by the winding influences the rotor, while the magnetic field on the other side cannot influence the rotor, which leads to a waste of energy.

SUMMARY

To overcome the defects of the existing technology, the technical problem to be resolved is: how to use the magnetic fields on both sides of the stator winding to drive the rotor.

For this purpose, the present invention adopts the following technical scheme:

A new two-stator and four-rotor combined energy-saving motor comprises a motor shell, four rotors and two stators, wherein the stators and the rotors are arranged in the motor shell; the stator comprises a plurality of circularly distributed stator cores, and the stator cores are wound with magnetic induction lines passing through the coils at both radial sides of the stator cores; the rotor comprises an outer rotor part, an inner rotor part and a flange; the outer rotor part is arranged outside the cylindrical inner rotor part, a stator zone is formed between the outer rotor part and the inner rotor part, and the outer rotor part and the inner rotor part are connected by flange; the flange divides the stator zone into a first stator zone and a second stator zone, and the two stators are arranged in the first stator zone and the second stator zone; the inner side of the outer rotor part and the outer side of the inner rotor part are provided with a plurality of circularly distributed permanent magnet modules, and two adjacent permanent magnet modules have opposite polarity.

Beneficially or exemplarily, the stator further comprises a fixing ring, and the stator cores are circularly distributed on the fixing ring; the stator furthers comprises a fixing support, which fixes the stator cores on the fixing ring; the stator cores are an I-shaped structure, which comprises a first arch part, a second arch part and a middle part, wherein the first arch part and the second arch part are connected by the middle part, the coils are wound on the middle part with slots at both sides, the first arch part faces towards the outer rotor part, and the second arch part faces towards the inner rotor part; a fixing hole of the first arch part vertically runs through the first arch part, and the fixing support runs through the fixing hole and is fixedly connected to the fixing ring.

Beneficially or exemplarily, each of the permanent magnet modules comprises a plurality of permanent magnets, wherein the permanent magnets of the permanent magnet module of the inner rotor part are vertically mounted along the outer side thereof, and the permanent magnets of the permanent magnet module of the outer rotor part are inclinedly mounted along the inner side thereof.

Beneficially or exemplarily, each of the permanent magnet modules comprises a plurality of permanent magnets, wherein the permanent magnets of the permanent magnet module of the inner rotor part are inclinedly mounted along the outer side of the inner rotor part, and the permanent magnets of the permanent magnet module of the outer rotor part are vertically mounted along the inner side of the outer rotor part.

Beneficially or exemplarily, the angle of inclination of the inclinedly mounted permanent magnets is 5 to 15 degrees.

Beneficially or exemplarily, the permanent magnet modules of the inner rotor part and the outer rotor part have opposite positions and same quantity, and the permanent magnet modules at the opposite positions of the inner rotor part and the outer rotor part.

Beneficially or exemplarily, the permanent magnets of the permanent magnet module of the inner rotor part are vertically mounted along the outer side of the inner rotor part, and the permanent magnets of the permanent magnet module of the outer rotor art are vertically mounted along the inner side of the outer rotor part.

Beneficially or exemplarily, it further comprises a rotating shaft, wherein the rotating shaft is connected to the inner rotor part, and runs through and is connected to the frontend cover and the backend cover through rotation of a bearing, and the stators are fixed on the frontend cover and the backend cover.

The present invention has the beneficial effect as follows:

By designing the structure of the stator and rotor, the present invention makes full use of the magnetic field on both sides of the stator acting with the inner rotor part and the outer rotor part, and the overall output power of the motor is equal to the sum of the powers of the inner rotor part and the outer rotor part, which makes full use of the magnetic field on both sides of the stator and avoids the waste of energy.

10—motor shell; 20—stator; 21—fixing ring; 22—stator core; 221—the first arch part; 222—the second arch part; 223—middle part; 224—fixing hole; 23—coil; 24—fixing support; 30—rotor; 31—outer rotor part; 32—inner rotor part; 33—flange; 34—rotating shaft; 35—permanent magnet module; 36—the first stator zone; 37—the second stator zone; 40—frontend cover; 50—backend cover

DETAILED DESCRIPTION

Figure 1:
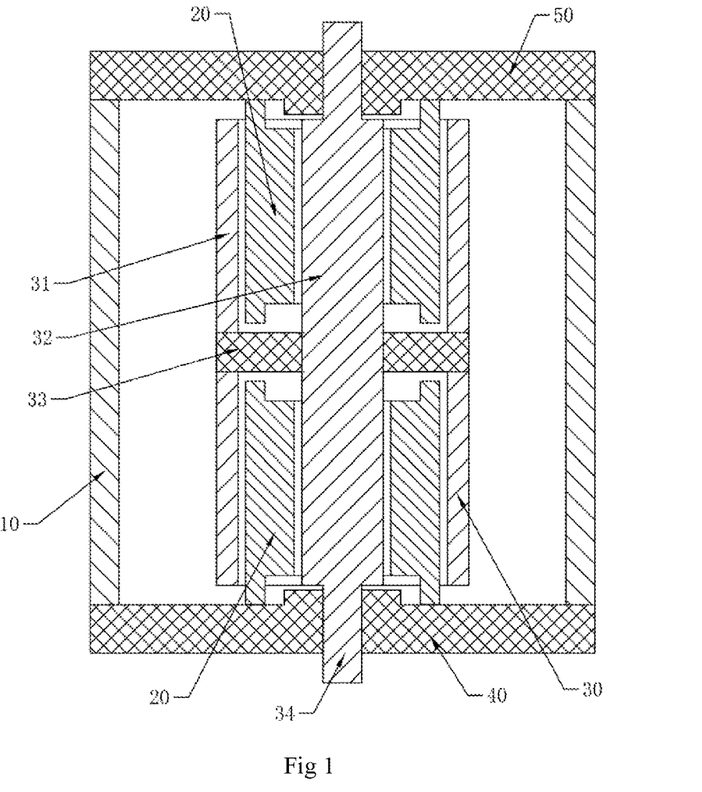
FIG. 1 is a sectional view of the structure of a new two-stator four-rotor combined energy-saving motor in an embodiment of the present invention
Figure 2:
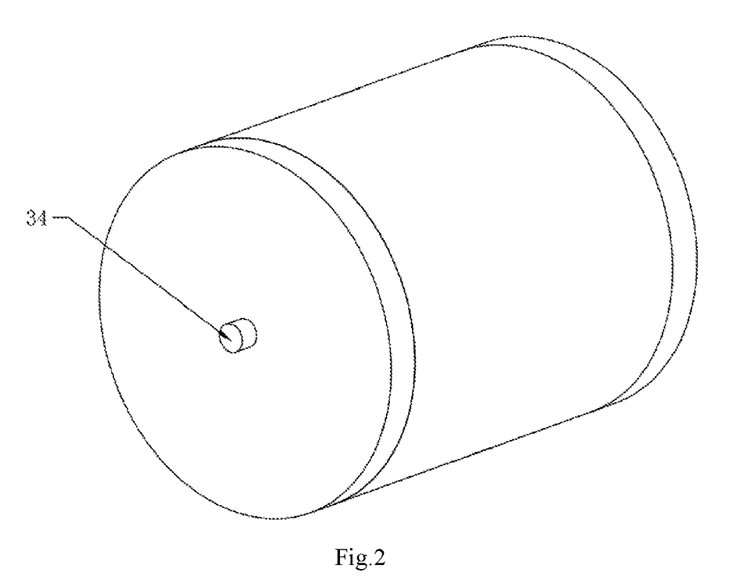
FIG. 2 is the structural stereogram of a new two-stator and four-rotor combined energy-saving motor in an embodiment of the present invention
Figure 3:
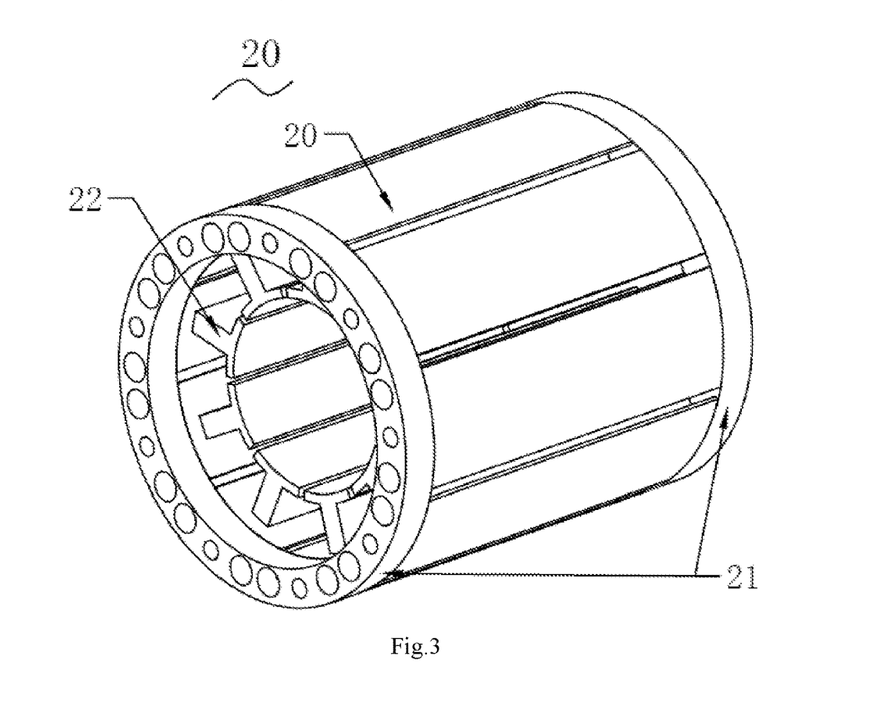
FIG. 3 is a structural view of the stator of a new two-stator and four-rotor combined energy-saving motor in an embodiment of the present invention
Figure 4:
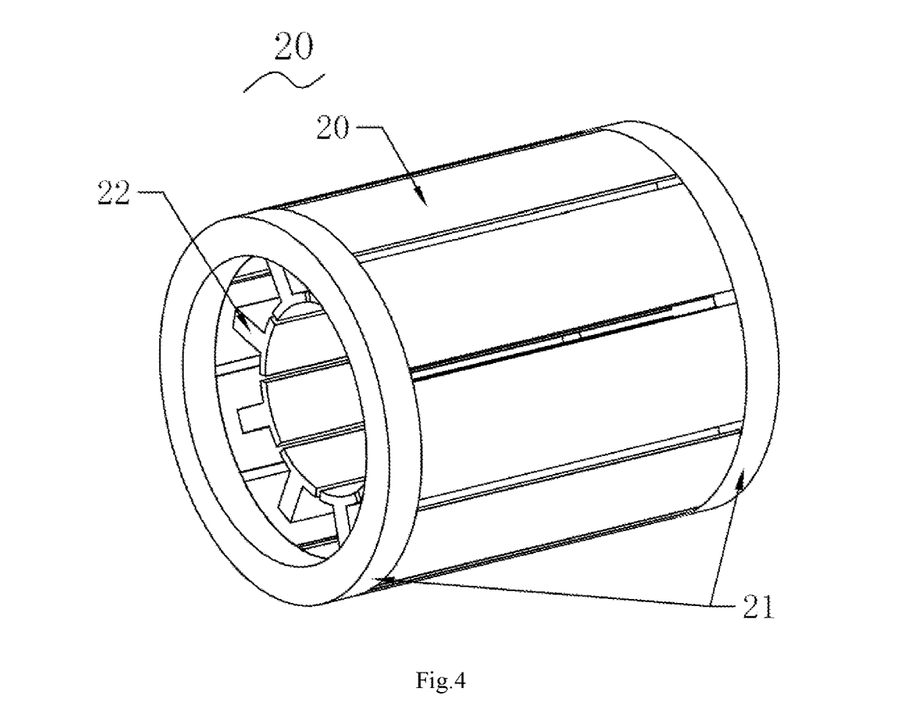
FIG. 4 is another view of the stator of a new two-stator four-rotor combined energy-saving motor in an embodiment of the present invention
Figure 5:
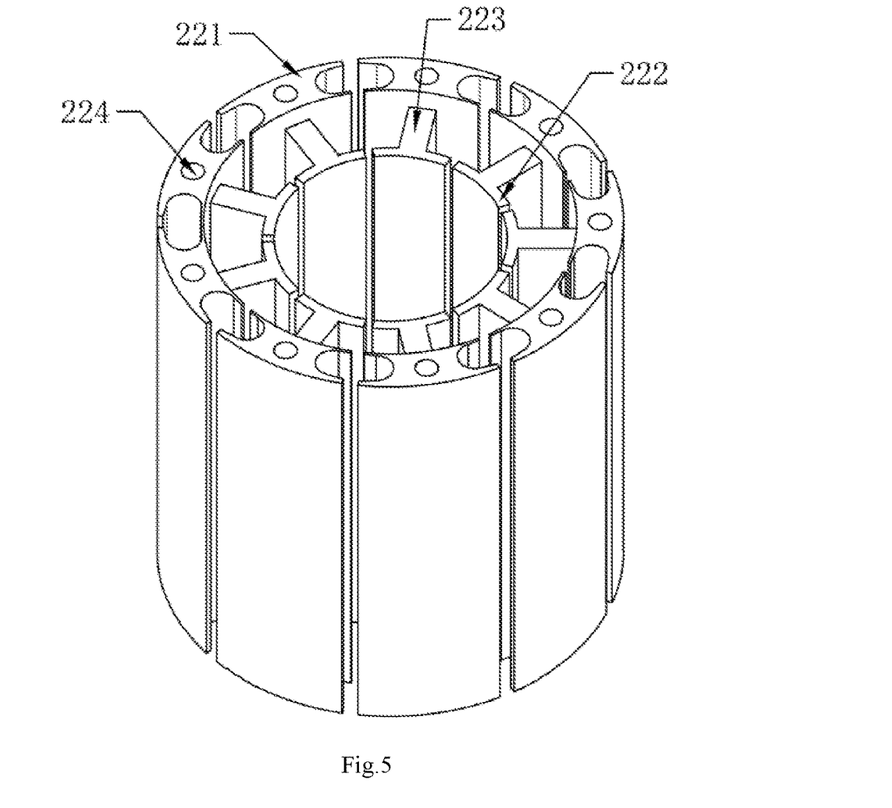
FIG. 5 is a schematic diagram of the stator core distribution of a new two-stator and four-rotor combined energy-saving motor in an embodiment of the present invention
Figure 6:
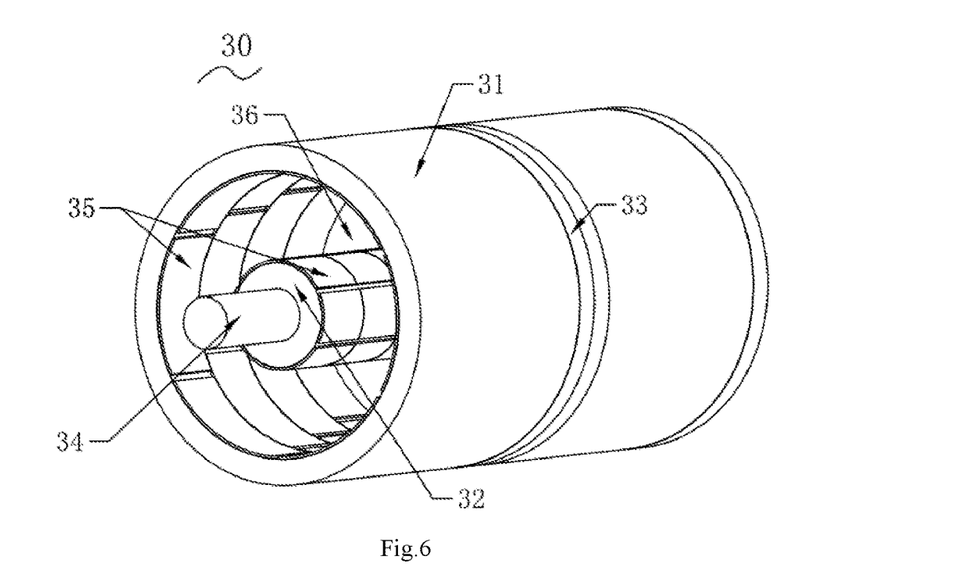
FIG. 6 is the structural diagram of the rotor of a new two-stator and four-rotor combined energy-saving motor in an embodiment of the present invention
Figure 7:
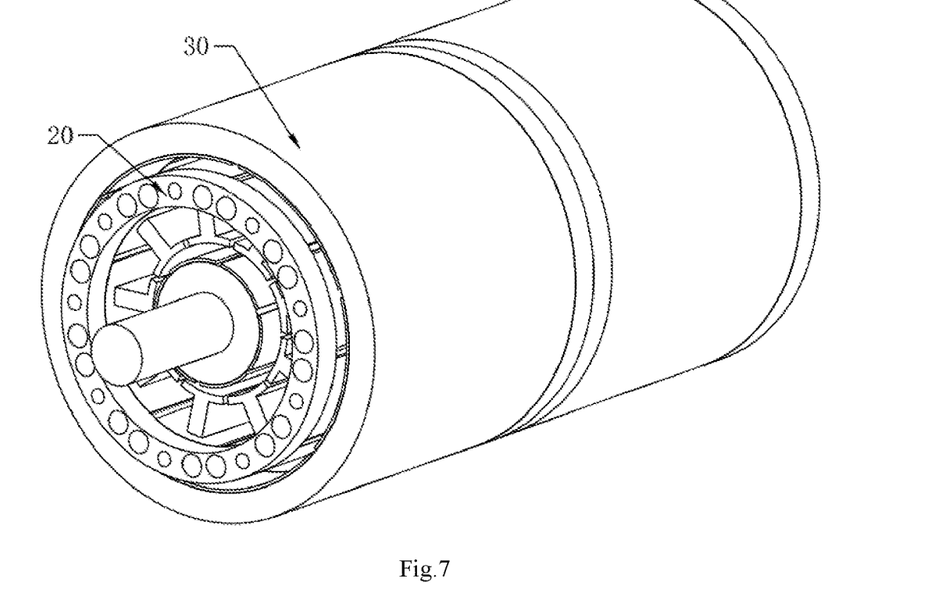
FIG. 7 is a matching diagram of the stator and rotor of a new two-stator and four-rotor combined energy-saving motor in an embodiment of the present invention
Figure 8:
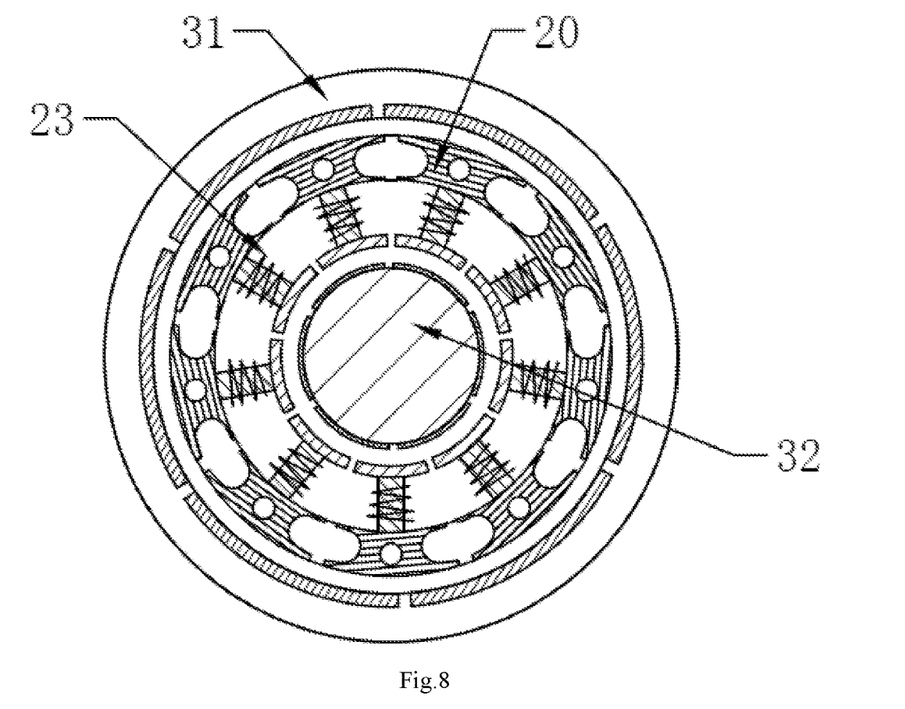
FIG. 8 is a sectional view of the stator and rotor of a new two-stator and four-rotor combined energy-saving motor in an embodiment of the present invention
Figure 9:
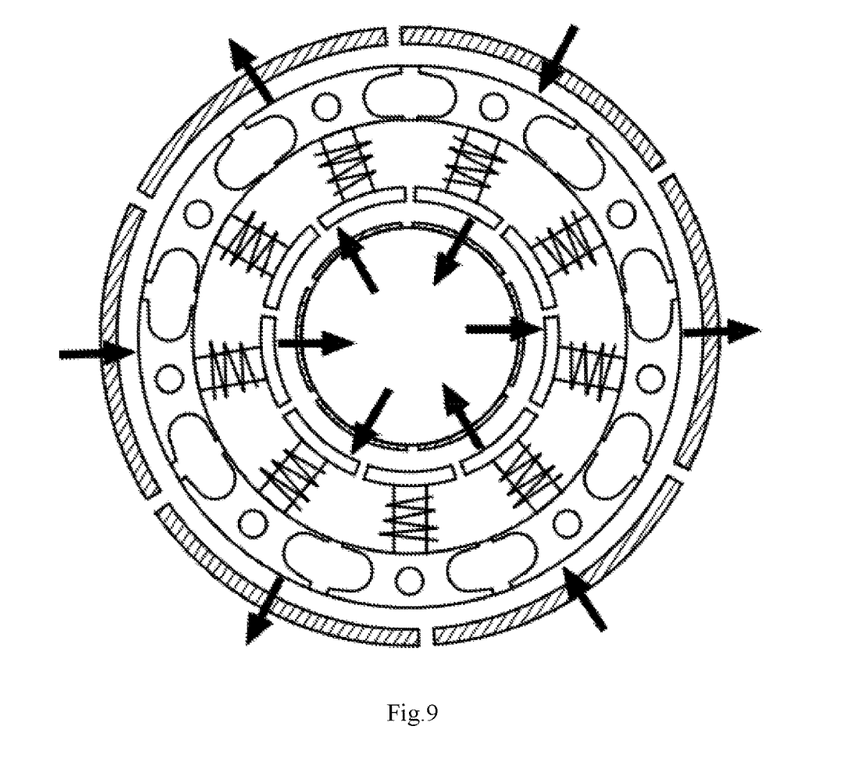
FIG. 9 is a directional diagram of the magnetic induction lines of the permanent magnet modules of the inner rotor part and the outer rotor part of a new two-stator four-rotor combined energy-saving motor
Figure 10:
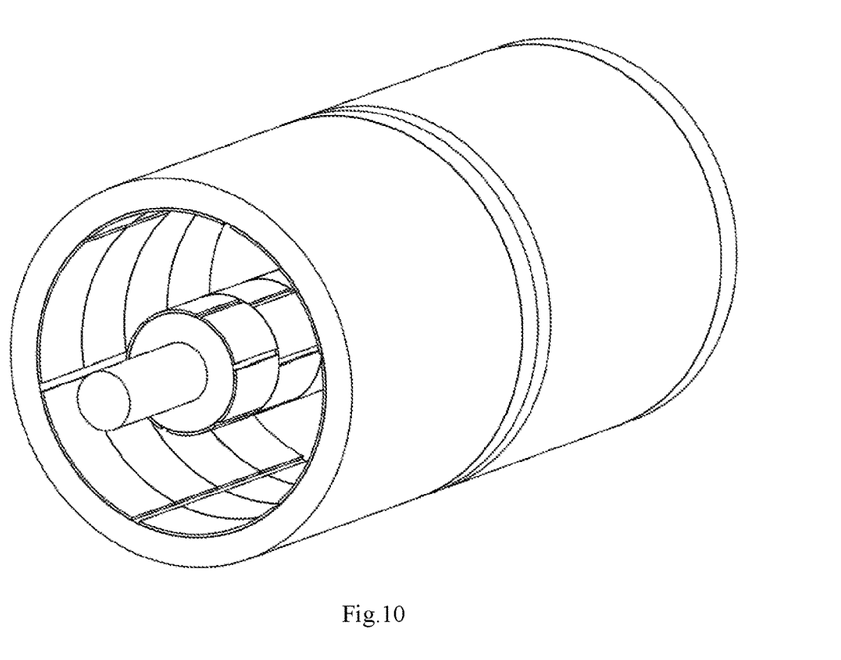
FIG. 10 is a structural diagram of the rotor of a new two-stator and four-rotor combined energy-saving motor in an embodiment of the present invention
Figure 11:
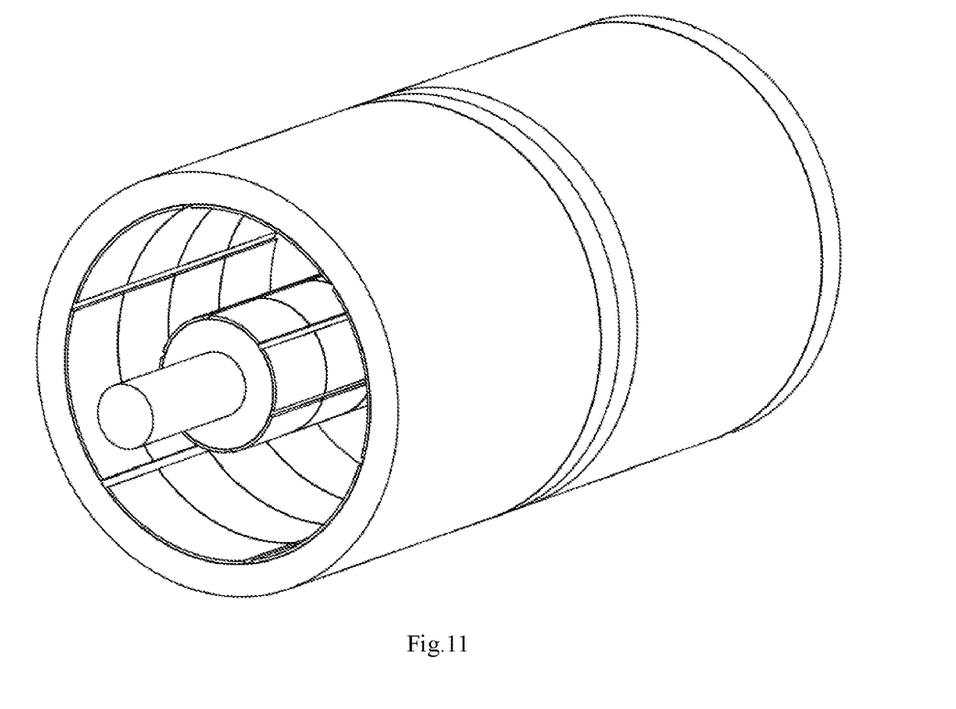
FIG. 11 is a structural diagram of the rotor of a new two-stator four-rotor square-wave permanent magnet energy saving motor in an embodiment of the present invention
Figure 12:
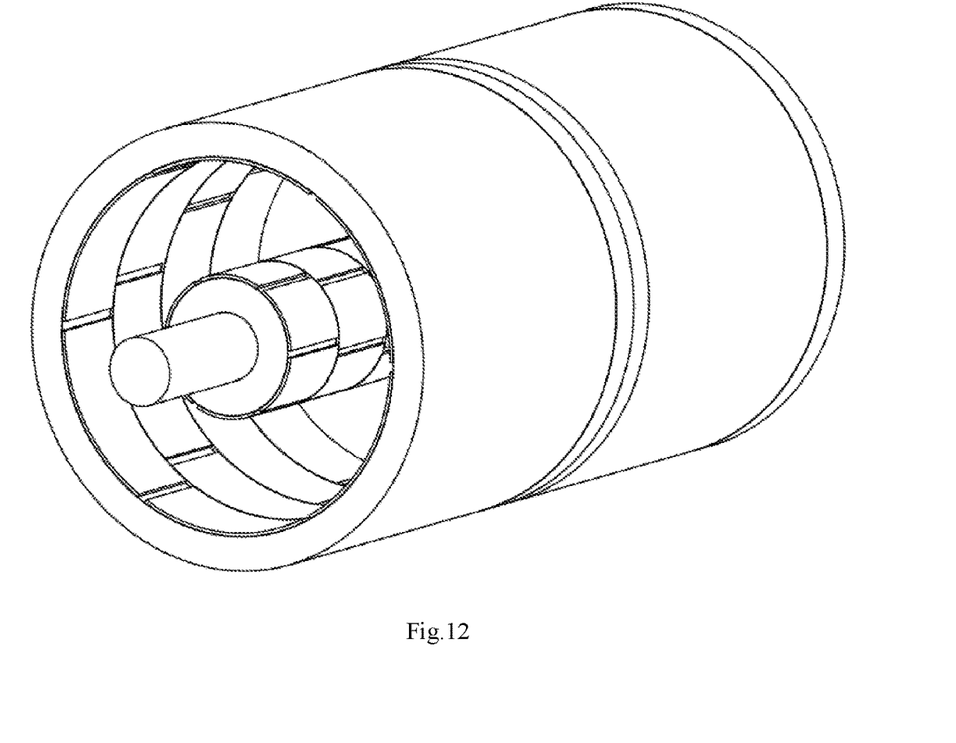
FIG. 12 is a structural diagram of the rotor of a new two-stator four-rotor sinusoidal permanent magnet energy saving motor in an embodiment of the present invention
Figure 13:
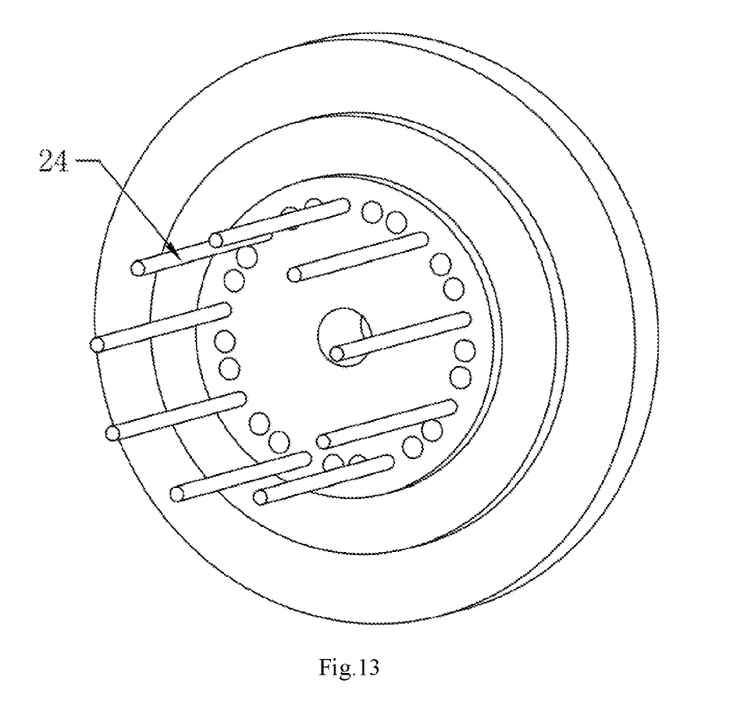
FIG. 13 is the structural diagram of the frontend cover or backend cover of a new two-stator and four-rotor combined energy-saving motor in an embodiment of the present invention
Figure 14:
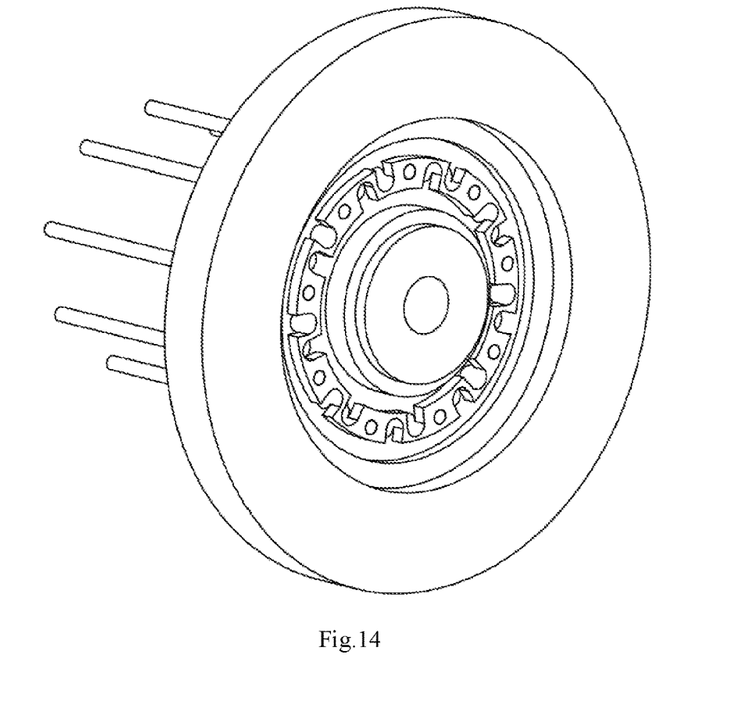
FIG. 14 is another structural diagram of the frontend cover or backend cover of a new two-stator and four-rotor combined energy-saving motor in an embodiment of the present invention
Figure 15:
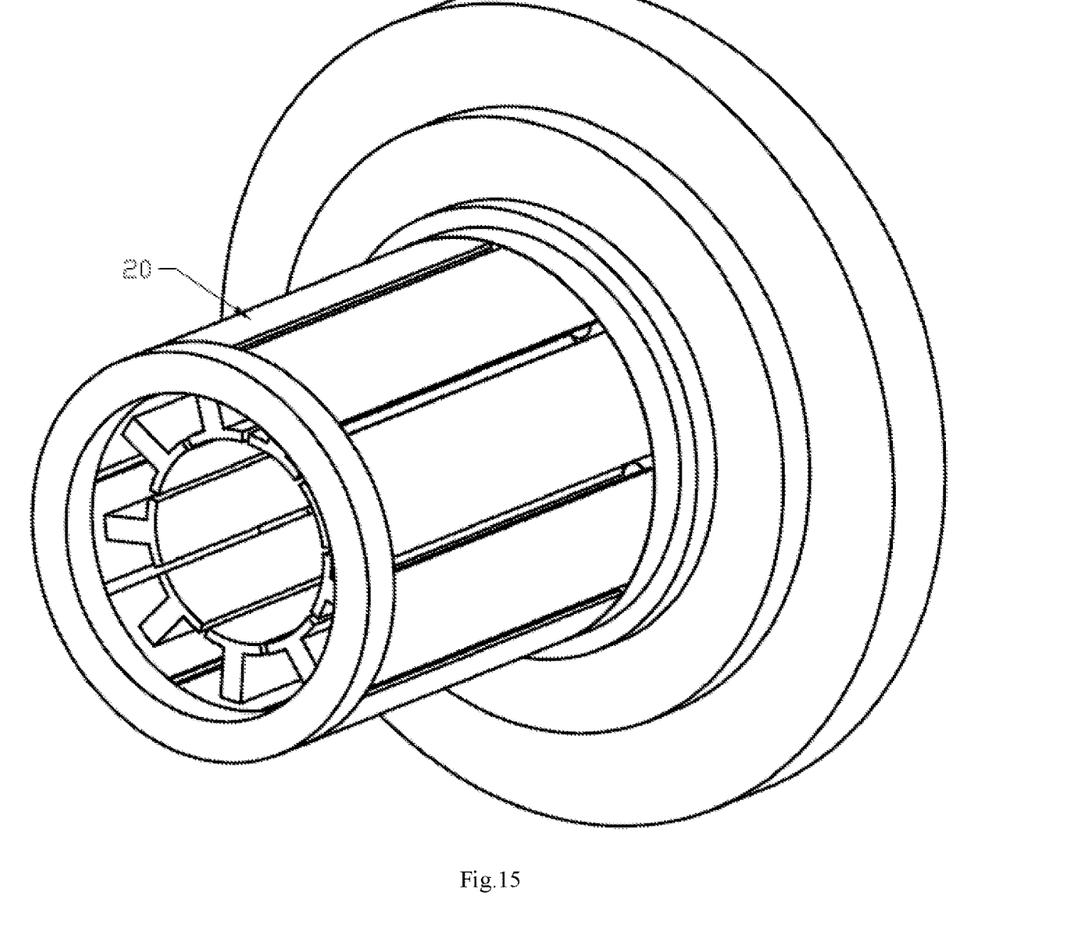
FIG. 15 is a matching diagram of the front or backend cover and the stator of a new two-stator and four-rotor combined energy-saving motor in an embodiment of the present invention
Figure 16:
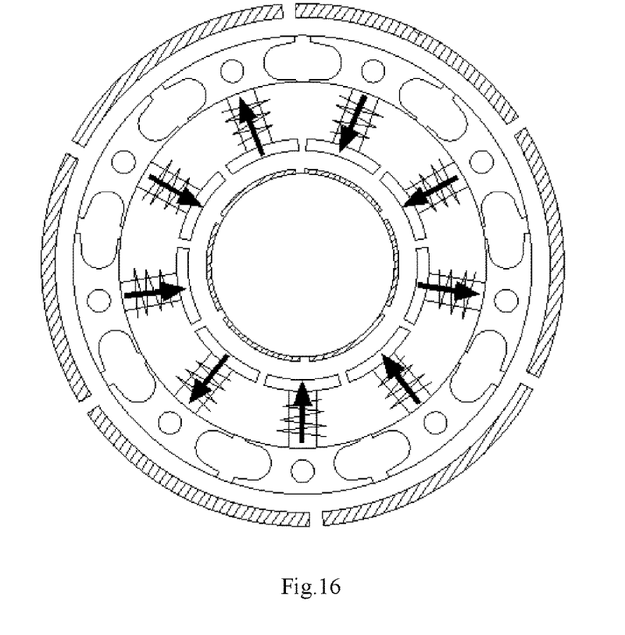
FIG. 16 is the directional diagram of the magnetic induction lines of the coils of the stator core at a certain moment of a new two-stator and four-rotor combined energy-saving motor in an embodiment of the present invention.
Figure 17:
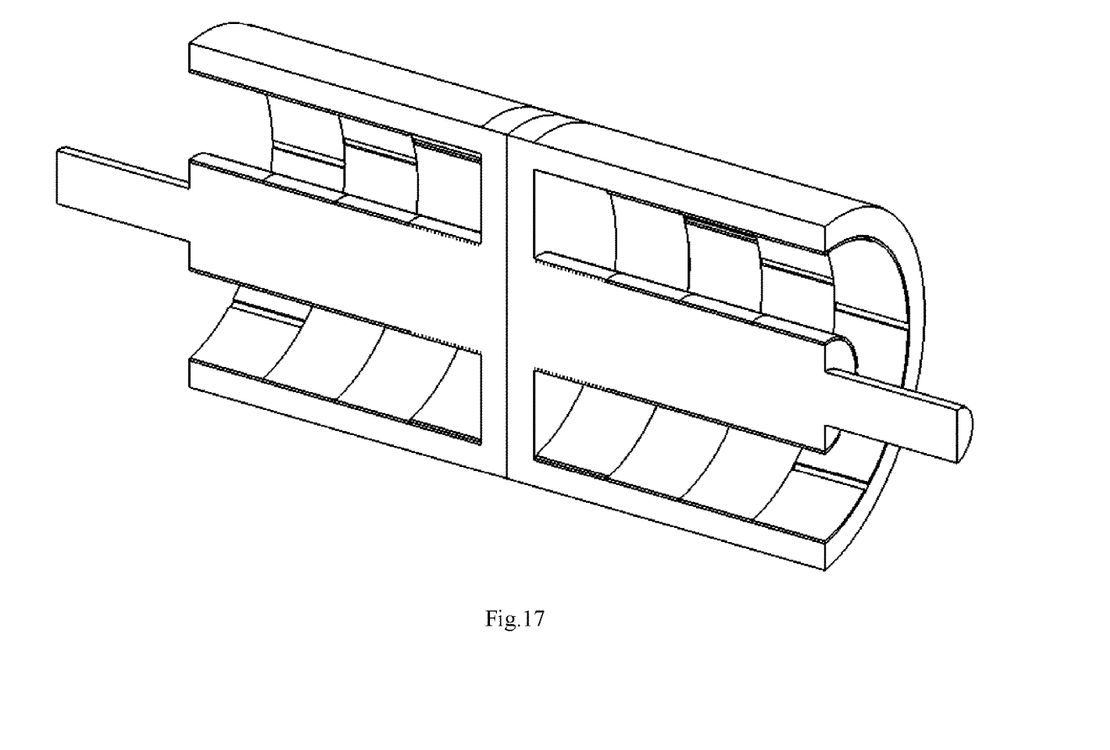
FIG. 17 is a sectional view of the rotor of a new two-stator four-rotor combined energy-saving motor in an embodiment of the present invention In the drawing.

Explanations to accompany drawings:

FIG. 1 shows the structural relationship of stator 20 and rotor 30 from a sectional view, the two stators 20 arranged between the outer rotor part 31 and the inner rotor part 32 of rotor 30. FIG. 2 shows the overall picture of the motor. FIG. 3 and FIG. 4 show the structural relationship of each component of stator 20 from different angles. FIG. 5 shows the distributional relationship of stator cores 22 in stator 20. FIG. 6 shows the structural relationship of each component of rotor 30, wherein FIG. 6 shows the structure of the rotor of a mixed-wave motor, the permanent magnet modules 35 of the outer rotor part 31 are inclinedly mounted along the side thereof, and the permanent magnet modules 35 of the inner rotor part 32 are vertically mounted along the side thereof. FIG. 7 shows the structural relationship of stator 20 and rotor 30 from a three-dimensional view. FIG. 8 shows the structural relationship of stator 20 and rotor 30 from another sectional view. FIG. 9 shows the direction of the magnetic induction lines of the permanent magnet modules 35 of the inner rotor part 32 and the outer rotor part 31 of rotor 30. FIG. 10-12 show the structure of the rotor in different embodiments of the present invention, wherein FIG. 10 shows the structure of the rotor of a mixed-wave motor, FIG. 11 shows the structure of the rotor of a square-wave motor, and FIG. 12 shows the structure of the rotor of a sinusoidal-wave motor. FIG. 13 shows the structure of a fixing support 24 capable of fixing stators 20 on the end covers. FIG. 14 shows the structure of the end covers in FIG. 13 from another direction. FIG. 15 shows the structure when the stators 20 are fixed on the end covers in FIG. 13. FIG. 16 shows the direction of the magnetic induction lines of the coils 23 of stator 20 at a certain moment, wherein each coil 23 acts as a separate magnet and sends out magnetic induction lines towards both radial sides of stator core 22. FIG. 17 shows the sectional structure of the rotor.

The technical scheme of the present invention is further explained in combination with the accompanying drawings and through the specific embodiments.

Embodiment 1

The new two-stator and four-rotor combined energy-saving motor in the embodiment comprises a motor shell 10, four rotors 30 and two stators, wherein the stators 20 and the rotors 30 are arranged in the motor shell 10, the stator 20 comprises a plurality of circularly distributed stator cores, and the stator cores 22 are wound with magnetic induction lines passing through the coils 23 at both radial sides of the stator cores 22; the rotor 30 comprises an outer rotor part 31, an inner rotor part 32 and a flange 33; the circular outer rotor part 31 is arranged outside the cylindrical inner rotor part 32, a stator zone is formed between the outer rotor part 31 and the inner rotor part 32, and the outer rotor part 31 and the inner rotor part 32 are connected by flange; the flange divides the stator zone into a first stator zone 36 and a second stator zone 37, and the two stators 20 are arranged in the first stator zone 36 and the second stator zone 37 respectively; the inner side of the outer rotor part 31 and the outer side of the inner rotor part 32 are provided with circularly distributed permanent magnet modules 35, and two adjacent permanent magnet modules 35 have opposite polarity.

There are various winding methods on the stator core, and the matching mode of coil 23 and permanent magnet module 35 is the same as that of ordinary motor; in an embodiment, the quantity ratio of the permanent magnet modules 35 of the outer rotor part 31, coils 23 and the permanent magnet modules 35 of the inner rotor part 32 is 2:3:2. The quantity ratio may vary in other embodiments.

The two-stator and four-rotor combined energy-saving motor in this embodiment can be used as both motor and generator.

When used as an electric motor, the coils 23 of the stator core 22 are supplied with three-phase current; since the stator core 22 is made of magnetic material, the magnetic induction lines of the coils 23 can run through both radial sides of the stator core 22 after the coils 23 of the stator core 22 are energized; meanwhile, since the outer rotor part 31 and the inner rotor part 32 are arranged at both radial sides of the stator core 22, the magnetic induction lines generated by coils 23 act on the outer rotor part 31 and the inner rotor part 32 at both radial sides. At this moment, each stator core 22 forms a separate magnet and generates a magnetic field with different phases, wherein North pole and South pole are at both radial sides of coil 23 respectively and face towards the outer rotor part 31 and the inner rotor part 32 respectively. The direction and the strength of the magnetic field generated by the coils 23 of the stator core 22 change with time, and two adjacent coils 23 of the stator core 22 have different phases.

When the three-phase current changes, the magnetic field of the stator core 22 changes, and the stators 20 generate a rotating magnetic field to drive the outer rotor part 31 and the inner rotor part 32 provided with permanent magnet modules 35 to rotate.

FIG. 9 shows the direction of the magnetic induction lines of the permanent magnet module 35 in an embodiment.

When used as a motor, there are two functions that increase the output power of rotor 20.

First, as stated above, since the magnetic induction line can pass through both radial sides of the stator core 22, the magnetic induction line of coil 23 is fully utilized. The rotating magnetic field drives the inner rotor part 32 and the outer rotor part 31 to rotate at the same time, and the output power of rotor 20 is equal to the sum of the output power of inner rotor part 32 and outer rotor part 31.

Second, within a certain angle range, the magnetic induction lines of the inner rotor part 32 can enhance the magnetic field generated on the stator core 22, thus increasing the force exerted by the magnetic field on the outer rotor part 31. Specifically, when rotor 30 rotates within a certain angle range, the stator core 22 with good magnetic permeability is affected by the magnetic induction line of inner rotor part 32 to generate an induced magnetic field. Within this specific angle range, the induced magnetic field generated by stator core 22 is in the same direction as the magnetic field generated by coil 23; at this point, when the two magnetic fields are superimposed, the magnetic field intensity generated on stator core 22 is equal to the sum of the rotating magnetic field of coil 23 and the induced magnetic field of stator core 22. As a result, the magnetic field generated on the stator core 22 is strengthened and the magnetic field acting on the outer rotor part 31 is strengthened, thus increasing the acting force on the outer rotor part 31. Similarly, in another specific angle range, the magnetic induction lines of the outer rotor section 31 can also enhance the magnetic field generated on the stator core 22, thus increasing the force of the magnetic field on the inner rotor section 32. In one embodiment, the cycle of a three-phase current is adaptively adjusted to obtain the specific angle.

The specific angle is generated under the following conditions: the induced magnetic field generated by the stator core 22 under the permanent magnet module 35 is the same direction as the rotating magnetic field of the coil 23 at this time.

Taking the rotating magnetic field of coil 23 on a stator core 22 enhanced by inner rotor part 32 as an example, the occurrence of one of the specific angles is described: The direction and strength of the magnetic field on a certain coil 23 varies with time. During a certain time, the coil 23 on a certain stator core 22 generates a magnetic field in one direction; meanwhile, one permanent magnet module 35 of the inner rotor part 32 sends out magnetic induction lines towards the first stator zone 36 in the direction opposite to that of the magnetic induction lines of the coils 23. When the permanent magnet module 35 rotates from one side of the stator core 22 to the position of the opposite stator core 22, the magnetic flux on the stator core 22 increases; thus, the stator core 22 generates an inductive magnetic field opposite to the magnetic field of the permanent magnet module 35. At this point, the direction of the induced magnetic field generated is the same as that of the magnetic induction line of coil 23, thus enhancing the rotating magnetic field of coil 23. In the actual situation, the magnetic field of coil 23 can be effectively enhanced with more locations meeting the occurrence conditions of this specific angle.

The above two actions coordinate with each other and increase the output power of rotor 30.

It should be noted that the four rotors in the name of this embodiment refer to the two outer rotor parts 31 and the two inner rotor parts 32 formed by the division of flange 33.

In fact, both the outer rotor part 31 and the inner rotor part 32 are divided into two parts by flange 33, corresponding to the stator in the first stator zone 36 and the stator in the second stator zone 37 respectively. The above effects exist for the stators 20 arranged in the first stator zone 36 and the second stator zone 37. In this embodiment, the two stators 20 drive the rotation of the four parts, and the overall output power of the rotor 30 is equal to the sum of the powers of the four parts.

In a further implementation, in order to ensure that the forces applied by the two stators to the outer rotor part 31 and the inner rotor part 32 can be superimposed, preferably the rotating magnetic fields of the two stators 20 have the same phase and the same number of coils 23 and rotate synchronously; specifically, the two stators 20 are laterally symmetrical, the coils 23 of the opposite stator cores 22 have the same phase of current, and generate the rotating magnetic field with the same phase and direction after energizing. Further, the outer rotor part 31 and the inner rotor part 32, which are divided into two parts by flange 33, are also laterally symmetrical, and the permanent magnet modules 35 are distributed in the same position with the same polarity.

At this point, the two stators 20 have the same number of poles, the forces exerted on the outer rotor part 31 and the inner rotor part 32 have the same direction, which can be superimposed and drive the rotor 30 to rotate, further enhancing the output efficiency of rotor 30.

Compared with the traditional motor, through the structural design of stator 20 and rotor 30 in this embodiment, the stators 20 in the inner stator zone 36 take each stator core 22 as a separate magnet winding, which can utilize the magnetic field at both side of multiple separate magnet windings to drive the outer rotor part 31 and the inner rotor part 32 of rotor 30, meaning to utilize the magnetic field at both sides of the stators 20 in the inner stator zone 36 to drive the outer rotor part 31 and the inner rotor part 32 of rotor 30; thus, the overall output power of rotor 30 is equal to the sum of the output powers of the inner rotor part 32 and the outer rotor part 31, which fully utilizes the magnetic field at both sides of stator 20 and avoids the waste of energy. Compared with the traditional motor, under the condition of reaching the same power, the present invention uses fewer winding sets, which reduces stator 20 size, uses fewer winding materials, and has higher economic benefit.

When used as a generator, since the stator cores 22 are made of magnetic material, the magnetic induction lines of the permanent magnet modules 35 of the inner rotor part 32 and the outer rotor part 31 can act on the coils 23 through both radial sides of the stator core 22; at this point, when rotor 30 rotates, the permanent magnet modules 35 thereof rotate to generate a rotating magnetic field, and the coils 23 on the stator 20 generate magnetic induction and generate electromotive force and output power.

For the stators 20 arranged in the first stator zone 36 and the second stator zone 37 respectively, all the above effects exist. The out power of the generator is equal to the sum of the powers generated by the four rotating parts.

In an implementation, the outer rotor part 31 and the inner rotor part 32 are divided into two parts by flange 33 and are also laterally symmetrical, and the permanent magnet modules 35 are arranged in a constant position, which makes the rotating rotors 30 generate alternating current with the same initial phase and frequency to the two stators 20 and further superimposes the electromotive forces generated by the stators 20.

Compared with the traditional generator, the coils 23 of the stators 20 in this embodiment are synchronously affected by the magnetic induction lines generated by the permanent magnet modules 35 of the outer rotor part 31 and those generated by the permanent magnet modules 35 of the inner rotor part 32, and the magnetic flux of the coils 23 of the stators 20 changes more and can generate stronger electromotive force.

Embodiment 2

The embodiment provides a method for fixing the stators 20 of a new two-stator and four-rotor combined energy-saving motor, as shown in FIG. 5, wherein the stator 20 further comprises a fixing ring 21 and a fixing support, the stator cores 22 are circularly distributed on the fixing ring 21, and the fixing support 24 is used for fixing the stator cores 22 on the fixing ring 21.

In an implementation, the stator cores 22 are an I-shaped structure, which comprises a first arch part 221, a second arch part 222 and a middle part 223, wherein the first arch part 221 and the second arch part 222 are connected by the middle part 223, the coils 23 are wound on the middle with slots at both sides, the first arch part 221 faces towards the outer rotor part 31, and the second arch part 222 faces towards the inner rotor part 32.

In the further implementation, a fixing hole 224 of the first arch part 221 vertically runs through the first arch part 221, the fixing support 24 passes through the fixing hole 224 and is fixedly connected to the fixing ring 21, to ensure the opposite positions between stator cores 22. Preferably, two fixing rings 21 can be set, and the stator cores 22 are fixed between two fixing rings 21; one end of the fixing support 24 penetrates into the fixing hole 224 from the fixing ring 21 at one side, extends towards the other fixing ring 21 along the fixing hole 224, and is fixedly connected to the other fixing ring 21. Further, the other end of the fixing support 224 is fixed to the frontend cover 40 or the backend cover 50, and the frontend cover 40 is opposite to the backend cover 50, which are arranged at both sides of the motor shell 10 respectively.

Embodiment 3

This embodiment provides a new two-stator and four-rotor combined energy-saving motor capable of generating mixed waves. FIG. 6 shows the structure of the rotor of a mixed-wave motor, wherein each of the permanent magnet modules 35 comprises a plurality of permanent magnets, the permanent magnets of the permanent magnet modules 35 of the inner rotor part 32 are vertically mounted along the outer side thereof, and the permanent magnets of the permanent magnet modules 35 of the outer rotor part 31 are inclinedly mounted along the inner side thereof. Or, FIG. 10 shows the structure of the rotor of another mixed-wave motor, wherein the permanent magnets of the permanent magnet modules 35 of the inner rotor part 32 are inclinedly mounted along the outer side thereof, and the permanent magnets of the permanent magnet modules 35 of the outer rotor part 31 are vertically mounted along the inner side thereof.

The working process of the present embodiment, when used as a motor, is similar as that of the above embodiment 1.

In this embodiment, when used as a generator, particularly the inclinedly mounted permanent magnet module 35 enables stator 20 to generate sinusoidal alternating current; meanwhile, the vertically mounted permanent magnet module 35 enables stator 20 to generate square-wave alternating current. Thus, the stator 20 can generate sinusoidal waves combined with square waves, which realizes the output of mixed waves. According to the need, the waveform of alternating current can be selected adaptively to make it suitable for practical application.

In this embodiment, since the output waveform is a mixed wave of sinusoidal wave combined with square wave, the sinusoidal wave controller or square wave controller can be selected when selecting the controller, which improves the applicability of the motor.

Further, the angle of inclination of the inclinedly mounted permanent magnets is 5 to 15 degrees, preferably to be 10 degrees. As shown in FIG. 6 and FIG. 10, the angle of inclination of the inclinedly mounted permanent magnets is 10 degrees.

Further, the permanent magnet modules 35 of the inner rotor part 32 and the outer rotor part 31 have the same quantity, and the permanent magnet modules 35 have the same quantity of permanent magnets.

In an implementation, when the permanent magnets 35 of the outer rotor part 31 or the inner rotor part 32 are inclinedly mounted, the inclinedly mounted permanent magnets 35 are divided by flange 33 to correspond to different stators 20; at this point, the positions of the permanent magnets 35 corresponding to different stators 20 correspond to each other, which superimposes and maximizes the forces exerted on the rotor part with inclinedly mounted permanent magnets by two rotors 20 with the same rotating magnetic field.

Embodiment 4

The embodiment provides a new sinusoidal-or-square-wave two-stator and four-rotor combined energy-saving motor capable of generating sinusoidal or square wave. As shown in FIG. 11 and FIG. 12, the permanent magnet modules 35 of the inner rotor part 32 and the outer rotor part 31 have the opposite positions and the same quantity, and the permanent magnet modules 35 at the opposite positions of the inner rotor part 32 and the outer rotor part 31 have opposite polarity facing towards the stator zone.

In this embodiment, when used as an electric motor, the output power of rotor 30 can be further increased for the following reasons:

Since the permanent magnet modules 35 at the opposite positions of the outer rotor part 31 and the inner rotor part 32 have opposite polarity, the magnetic induction lines of the permanent magnet modules 35 of the outer rotor part 31 and the inner rotor part 32 are mutually constrained, which makes most of the magnetic induction lines of the permanent magnet modules 35 constrained between the opposite permanent magnet modules 35, thus the magnetic induction lines in the stator zone are more concentrated and the magnetic field is stronger. Thus, when the coils 23 are energized and generate a rotating magnetic field, the force of the rotating magnetic field on the permanent magnet modules 35 at inner and outer sides is enhanced, which further increases the output power of rotor.

When used as a generator, it is similar as a motor. There is also the situation that the magnetic induction lines are mutually constrained, leading to the accumulation of magnetic induction lines. The generating power of the generator is enhanced.

In a further implementation, FIG. 12 shows the structure of the rotor of a sinusoidal-wave motor, wherein the permanent magnets of the permanent magnet modules 35 of the inner rotor part 32 and the outer rotor part 33 are inclinedly mounted along the side thereof, preferably the angle of inclination of the permanent magnets of the two parts are the same.

In an implementation, the angle of inclination of the inclinedly mounted permanent magnet modules 35 is 5 to 15 degrees, preferably to be 10 degrees. As shown in FIG. 12, the angle of inclination of the permanent magnets is 10 degrees.

The working process of this embodiment when used as an electric motor is similar as the above. When used as a generator, the sinusoidal alternating current is generated. The angle of inclination of the permanent magnets of the inclined permanent magnet module 35 affects the waveform of the sinusoidal wave generated by stator 20.

According to the actual application, choose the angle of inclination reasonably.

In another further embodiment, FIG. 11 shows the structure of the rotor of a square-wave motor, wherein the permanent magnets of the permanent magnet module 35 of the inner rotor part are vertically mounted along the outer side of the inner rotor part, and the permanent magnets of the permanent magnet module 35 of the outer rotor part are vertically mounted along the inner side of the outer rotor part.

When used as an electric motor, this embodiment is similar as the above process. When used as a generator, this embodiment generates square-wave current.

This embodiment can be used as a damping motor when the permanent magnet module 35 is mounted vertically. When used as a damping motor, the permanent magnet modules 35 of the inner side of the outer rotor part 31 and the outer side of the inner rotor part 32 have opposite positions and the magnetic field with the same direction. At this point, due to the opposite positions, the magnetic fields of the permanent magnet modules 35 of the inner rotor part 32 and the outer rotor part 31 can be directly superimposed, which makes the magnetic field acting on stator 20 larger than any of the permanent magnets inclinedly mounted. When the rotor 30 rotates, especially between the two permanent magnet modules 35, the magnetic flux of coil 23 on stator 20 changes from facing one side to facing the other side, and the numerical value changes greatly, which causes stator 20 to generate a great induced electromotive force and prevents rotor 30 from further rotating.

In this embodiment, similarly, since the two parts of permanent magnet modules 35 can be superposed, compared with the traditional damping motor, the induced electromotive force generated on stator 20 is larger and the damping effect is better.

Embodiment 5

This embodiment provides a method for arranging the rotating shaft of a new sinusoidal-wave or square-wave combined energy-saving motor with two stators and four rotors, which further comprises a rotating shaft 34, wherein the rotating shaft 34 is connected to the inner rotor part, and passes through and is connected to the frontend cover 40 and the backend cover 50 through rotation of a bearing, and the stators 20 are fixed on the frontend cover 40 and the backend cover 50.

When both vertical sides of the stator cores 22 are provided with a fixing ring 21, a hole for the fixing support 24 to pass through is arranged on the fixing ring 21 facing the frontend cover 40 or the backend cover 50, wherein the fixing support 24 passes through the hole and enters the fixing hole 224 of the stator core 22, and the fixing support is extended and fixed on the fixed ring 21 of the stator core 22 far away from the end cover. In this embodiment, a water-cooled heat dissipation structure can be set to dissipate heat from stator 20, whose specific structure is similar to that disclosed by CN204012958U.

The present invention is described by preferred embodiments and is known to the technical personnel in the field that, without deviating from the spirit and scope of the present invention, various changes or equivalent substitutions may be made to these characteristics and embodiments. The present invention shall not be restricted by the specific embodiments disclosed herein, and other embodiments falling within the claims of this application shall fall within the scope of protection of the present invention.

The invention claimed is:

1. A new two-stator energy-saving motor comprises a motor shell, two rotors and two stators, the stators and rotors arranged in the motor shell;
   wherein each of the stators comprises a plurality of circularly distributed stator cores, and the stator cores are wound with magnetic induction lines passing through the coils at both radial sides of the stator cores;
   each of the rotors comprises an outer rotor part, an inner rotor part and a flange; the outer rotor part, arranged outside the inner rotor part; the flange, connecting the outer rotor part and the inner rotor part, a first stator zone formed by the outer rotor part and the inner rotor part, and a first surface of the flange, a second stator zone formed by the outer rotor part and the inner rotor part, and a second surface of the flange, the two stators, arranged in the first stator zone and the second stator zone respectively;
   the inner side of each outer rotor part and the outer side of each inner rotor part are provided with a plurality of circularly distributed permanent magnet modules, and two adjacent permanent magnet modules have opposite polarity,
   wherein each permanent magnet module comprises a plurality of permanent magnets,
   wherein the permanent magnets of each permanent magnet module of each outer rotor part are mounted on the inner side of the outer rotor part along a circumferential direction of the outer rotor part,
   wherein each of the permanent magnets is offset by a substantial distance at the circumferential direction from another axially adjacent one of the permanent magnets, and
   wherein either:
   the permanent magnets of the permanent magnet module of each inner rotor part are vertically mounted along the outer side thereof, and the permanent magnets of the permanent magnet module of each outer rotor part are inclinedly mounted along the inner side thereof;
   or, the permanent magnets of the permanent magnet module of each inner rotor part are inclinedly mounted along the outer side of the inner rotor part, and the permanent magnets of the permanent magnet module of each outer rotor part are vertically mounted along the inner side of the outer rotor part.

2. The new two-stator energy-saving motor according to claim 1 is characterized in that each stator further comprises a fixing ring along which the stator cores are circularly distributed, each of the stators further comprises a fixing support, which fixes the stator cores to the fixing ring; the stator cores are an I-shaped structure, which comprises a first arch part, a second arch part and a middle part, wherein the first arch part and the second arch part are connected by the middle part, the coils are wound on the middle part with slots at both sides, the first arch part faces towards the outer rotor part, and the second arch part faces towards the inner rotor part;

a fixing hole of the first arch part vertically runs through the first arch part, and the fixing support passes through the fixing hole and is fixedly connected to the fixing ring.

3. The new two-stator energy-saving motor according to claim 1 is characterized in that the angle of inclination of the inclinedly mounted permanent magnets is 5 to 15 degrees.

4. The new two-stator energy-saving motor according to claim 1 further comprises a rotating shaft, wherein the rotating shaft is connected to each inner rotor part, and passes through and is connected to the frontend cover and fixed on the backend cover through rotation of a bearing, and one stator is fixed on the frontend cover and the other stator is fixed on the backend cover.

\* \* \* \* \*